(12) United States Patent
Ishii

(10) Patent No.: US 10,370,024 B2
(45) Date of Patent: Aug. 6, 2019

(54) TORQUE TRANSMISSION JOINT AND ELECTRIC POWER STEERING DEVICE

(71) Applicant: NSK LTD., Tokyo (JP)

(72) Inventor: Toru Ishii, Maebashi (JP)

(73) Assignee: NSK LTD., Tokyo (JP)

( * ) Notice: Subject to any disclaimer, the term of this patent is extended or adjusted under 35 U.S.C. 154(b) by 254 days.

(21) Appl. No.: 15/508,367

(22) PCT Filed: Apr. 24, 2015

(86) PCT No.: PCT/JP2015/062577
§ 371 (c)(1),
(2) Date: Mar. 2, 2017

(87) PCT Pub. No.: WO2016/084403
PCT Pub. Date: Jun. 2, 2016

(65) Prior Publication Data
US 2017/0297610 A1    Oct. 19, 2017

(30) Foreign Application Priority Data

Nov. 28, 2014   (JP) ................................. 2014-241030
Feb. 18, 2015   (JP) ................................. 2015-029124

(51) Int. Cl.
*B62D 5/04*       (2006.01)
*F16D 3/58*       (2006.01)
(Continued)

(52) U.S. Cl.
CPC ............ *B62D 5/0409* (2013.01); *B62D 5/04* (2013.01); *F16D 3/18* (2013.01); *F16D 3/58* (2013.01);
(Continued)

(58) Field of Classification Search
CPC ........... B62D 5/04; B62D 5/0409; F16D 3/18; F16D 3/58; F16H 1/16; F16H 57/006; F16H 57/12; F16H 57/0006
See application file for complete search history.

(56) References Cited

U.S. PATENT DOCUMENTS 2,457,507 A    12/1948   Strachovsky
2,869,339 A    1/1959    Drake
(Continued)

FOREIGN PATENT DOCUMENTS

CN            1470775 A        1/2004
CN          101128682 A        2/2008
(Continued)

OTHER PUBLICATIONS

Search Report dated Jul. 14, 2015, issued by the International Searching Authority in counterpart International Application No. PCT/JP2015/062577 (PCT/ISA/210).
(Continued)

*Primary Examiner* — Anne Marie M Boehler
(74) *Attorney, Agent, or Firm* — Sughrue Mion, PLLC

(57) ABSTRACT

There is provided a torque transmission joint configured to transmit torque between end portions of a driving shaft and a driven shaft arranged in series in an axial direction. An outer-diameter-side concave-convex portion is formed on an inner periphery of one shaft of the driving shaft and the driven shaft or a member fixed to the one shaft, an inner-diameter-side concave-convex portion is formed on an outer periphery of the other shaft or a member fixed to the other shaft, and the outer-diameter-side concave-convex portion and the inner-diameter-side concave-convex portion are engaged with a circumferential gap being interposed therebetween. An elastic member is provided between the end portion of the driving shaft and the end portion of the driven shaft either directly or via another member such that torque (Continued)

can be transmitted between the driving shaft and the driven shaft.

10 Claims, 11 Drawing Sheets

(51) Int. Cl.
*F16H 1/16* (2006.01)
*F16D 3/18* (2006.01)
*F16H 57/00* (2012.01)
*F16H 57/12* (2006.01)

(52) U.S. Cl.
CPC ........... *F16H 1/16* (2013.01); *F16H 57/0006* (2013.01); *F16H 57/12* (2013.01); *B60Y 2306/09* (2013.01)

(56) References Cited

U.S. PATENT DOCUMENTS

| | | |
|---|---|---|
| 2008/0035414 A1 | 2/2008 | Kubota et al. |
| 2009/0270185 A1 | 10/2009 | Miyawaki |
| 2011/0240399 A1* | 10/2011 | Suzuki ................ B62D 5/0409 180/444 |

FOREIGN PATENT DOCUMENTS

| | | |
|---|---|---|
| EP | 2689988 A2 | 1/2014 |
| JP | 48-013627 A | 2/1973 |
| JP | 48-025138 A | 3/1973 |
| JP | 2004-306898 A | 11/2004 |
| JP | 2009-46060 A | 3/2009 |
| JP | 2009-108892 A | 5/2009 |
| JP | 2009-190519 A | 8/2009 |
| JP | 2012-131249 A | 7/2012 |
| JP | 2013-160241 A | 8/2013 |
| JP | 2013-249909 A | 12/2013 |
| WO | 2008/056636 A1 | 5/2008 |

OTHER PUBLICATIONS

Written Opinion dated Jul. 14, 2015, issued by the International Searching Authority in counterpart International Application No. PCT/JP2015/062577 (PCT/ISA/237).

Communication dated Mar. 27, 2018, from the European Patent Office in counterpart European Application No. 15862650.7.

Communication dated Jan. 9, 2019, issued by the State Intellectual Property Office of the People's Republic of China in counterpart Chinese Patent Application No. 201580063051.1.

* cited by examiner

TORQUE TRANSMISSION JOINT AND ELECTRIC POWER STEERING DEVICE

TECHNICAL FIELD

The present invention relates to a torque transmission joint configured to transmit torque between a driving shaft and a driven shaft and an electric power steering device configured to use an electric motor as an auxiliary power source.

BACKGROUND ART

When applying a steering angle to steered wheels (generally, front wheels except for a special vehicle such as a forklift), a power steering device has been widely used as a device for reducing a force necessary for a driver to operate a steering wheel. As such power steering device, an electric power steering device configured to use an electric motor as an auxiliary power source has also been recently used. Various structures have been known for the electric power steering device. In any structure, auxiliary power of the electric motor is applied via a reducer to a rotary shaft configured to rotate in accordance with an operation of the steering wheel and to apply the steering angle to the steered wheels as it rotates. As the reducer, a worm reducer is generally used. According to the electric power steering device using the worm reducer, a worm configured to rotate by the electric motor and a worm wheel configured to rotate together with the rotary shaft are meshed with each other such that the auxiliary power of the electric motor can be transmitted to the rotary shaft. In the worm reducer, an uncomfortable abnormal noise called as gear striking noise may be generated when changing a rotational direction of the rotary shaft due to a backlash existing at the meshed portion between the worm and the worm wheel.

As a structure capable of suppressing the gear striking noise, it has been considered to elastically press the worm toward the worm wheel by an elastic member such as a spring. FIGS. 9 and 10 show an example of the electric power steering device disclosed in Patent Document 1. A front end portion of a steering shaft 2 configured to rotate in a predetermined direction by a steering wheel 1 is rotatably supported within a housing 3, and a worm wheel 4 is fixed to this part. Worm teeth 5 configured to mesh with the worm wheel 4 are provided at an axially intermediate portion of a worm shaft 6, and both axial end portions of a worm 8 configured to rotate by an electric motor 7 are rotatably supported in the housing 3 by a pair of rolling bearings 9a, 9b such as deep groove ball bearings or the like. A pressing piece 10 is externally fitted to a tip portion of the worm shaft 6, which protrudes more than the rolling bearing 9a, and an elastic member such as a coil spring 11 is provided between the pressing piece 10 and the housing 3. By the coil spring 11, the worm teeth 5 provided on the worm shaft 6 are pressed toward the worm wheel 4 via the pressing piece 10. By this configuration, the backlash between the worm teeth 5 and the worm wheel 4 is suppressed to reduce the generation of the gear striking noise.

According to the conventional structure, it is possible to suppress the generation of the gear striking noise at the meshing part between the worm teeth 5 and the worm wheel 4. However, it is not possible to suppress an abnormal noise, which is to be generated at a coupling part between a tip portion of an output shaft 12 of the electric motor 7 and a base end portion of the worm shaft 6. This is described as follows. In the structure of FIG. 10, in order to couple the tip portion of the output shaft 12 of the electric motor 7 and the base end portion of the worm shaft 6 such that the torque can be transmitted, the base end portion of the worm shaft 6 is formed with a spline hole 13 opening toward a base end surface of the worm shaft 6.

The tip portion of the output shaft 12 is formed with a spline shaft portion 14. The spline shaft portion 14 and the spline hole 13 are spline-engaged, so that the output shaft 12 and the worm shaft 6 are coupled such that the torque can be transmitted.

When the spline shaft part 14 and the spline hole 13 are spline-engaged without a circumferential gap (without the backlash), the abnormal noise does not occur at the coupling portion (the spline engagement part) between the tip portion of the output shaft 12 and the base end portion of the worm shaft 6. However, in the actual situation, the backlash exists at the spline engagement part. Particularly, when the backlash between the worm teeth 5 and the worm wheel 4 is suppressed by the structure as shown in FIG. 10, it is not possible to completely remove the backlash of the spline engagement part because it is necessary to allow swingable displacement of the worm shaft 6.

Patent Document 2 discloses a structure where the output shaft of the electric motor and the worm shaft are coupled via a metallic cylindrical power transmission member such that the worm shaft can be smoothly swingably displaced. In the structure of Patent Document 2, since the worm shaft is swingably displaced, the backlashes exists at the spline engagement parts between the spline shaft portions (male splines) provided at both end portions of the power transmission member and the spline holes (female splines) provided at respective end portions of the worm shaft and the output shaft of the electric motor, respectively. Therefore, the abnormal noise may be generated when changing a rotational direction of the rotary shaft.

PRIOR ART DOCUMENTS

Patent Documents

Patent Document 1: JP-A-2004-306898
Patent Document 2: JP-A-2012-131249

SUMMARY OF THE INVENTION

Problems to be Solved

The present invention has been made in view of the above circumstances, and an object of the present invention is to provide a structure of a torque transmission joint capable of reducing generation of an abnormal noise when changing a rotational direction of a driving shaft.

Means for Solving the Problems

A torque transmission joint according to an embodiment of the present invention is configured to transmit torque between end portions of a driving shaft and a driven shaft arranged in series in an axial direction. An outer-diameter-side concave-convex portion is formed by alternately arranging concave portions and convex portions over an entire circumference either directly on an inner periphery of one shaft of the driving shaft and the driven shaft or on an inner periphery of a member fixed to the one shaft, and an inner-diameter-side concave-convex portion is formed by alternately arranging concave portions and convex portions over an entire circumference either directly on an outer periphery of the other shaft or on an outer periphery of a member fixed to the other shaft. The outer-diameter-side concave-convex portion and the inner-diameter-side concave-convex portion are engaged with a circumferential gap being interposed therebetween (with a backlash being provided therebetween). An elastic member made of an elastic material is provided between the end portion of the driving shaft and the end portion of the driven shaft either directly or via another member such that torque can be transmitted between the driving shaft and the driven shaft.

In the above configuration, the elastic member may include a column part arranged in the axial direction. Axial end portions of the column part may be engaged to engagement concave portions formed at portions deviating from a center axis of the driving shaft and a center axis of the driven shaft (including engagement holes penetrating those portions).

In this case, the column part may be provided in plural around the center axis of the driving shaft and the center axis of the driven shaft.

Also, each column part may be coupled by a circular plate-shaped or circular wheel-shaped coupling plate part.

Also, the driving shaft and the driven shaft may contact the coupling plate part so as to sandwich the coupling plate part therebetween.

Also, the engagement concave portions may have a widened part which is wider than a part to which the column part contacts to be engaged such that a gap is formed between the widened part and the column part.

Further, a concave part may be formed either directly on a center part of an end surface of the one shaft or on a center part of an end surface of the member fixed to the one shaft, and the outer-diameter-side concave-convex portion may be formed on an inner periphery of the concave part. A flange part having an outward flange shape may be formed either directly on an outer periphery of the end portion of the other shaft or on the member fixed to the other shaft, and the inner-diameter-side concave-convex portion may be formed on an outer periphery of the flange part. The engagement concave portions may be formed at a plurality of positions with equal intervals in a circumferential direction on a bottom surface of the concave part and on an axial side surface of the flange part facing the bottom surface.

Alternatively, a concave part may be formed either directly on a center part of an end surface of the one shaft or on a center part of an end surface of the member fixed to the one shaft, the outer-diameter-side concave-convex portion may be formed on an inner periphery of the concave part, and a first flange part having an outward flange shape may be formed either directly on an outer periphery of the end portion of the one shaft or on the member fixed to the one shaft. The inner-diameter-side concave-convex portion may be formed either directly on an outer periphery of the end portion of the other shaft or on an outer periphery of the member fixed to the other shaft, and a second flange part having an outward flange shape may be formed either directly on an outer periphery of an intermediate side part of the other shaft or on the member fixed to the other shaft. The engagement concave portions may be formed at a plurality of positions with equal intervals in a circumferential direction on axial side surfaces of the first and second flange parts facing each other.

An electric power steering device according to another embodiment of the present invention includes a housing, a steering rotary shaft, a worm wheel, a worm and an electric motor.

The housing is supported to a fixed part to be non-rotatable (non-rotatably supported).

The steering rotary shaft is provided to be rotatable relative to the housing and is configured to rotate by an operation of the steering wheel and to apply a steering angle to steered wheels according to the rotation.

The worm wheel is supported to a part of the steering rotary shaft concentrically with the steering rotary shaft in the housing and is configured to rotate together with the steering rotary shaft.

The worm includes worm teeth provided on an axially intermediate part of the worm shaft, and axial end portions of the worm shaft are rotatably supported to the housing by bearings, respectively, with the worm teeth being meshed with the worm wheel.

The electric motor is configured to rotate the worm.

An output shaft of the electric motor and the worm shaft are connected by a torque transmission joint such that torque can be transmitted.

Herein, the torque transmission joint is the above-described torque transmission joint. In this case, the output shaft of the electric motor corresponds to the driving shaft, and the worm shaft corresponds to the driven shaft.

In the meantime, a preload applying mechanism configured to elastically press the worm toward the worm wheel may be provided between a tip portion of the worm shaft (an end portion opposite to a side coupled to the output shaft of the electric motor through the torque transmission joint) and the housing.

Effects of the Invention

According to the torque transmission joint and the electric power steering device, it is possible to suppress an abnormal noise when changing a rotational direction of the driving shaft.

When the torque, which is to be transmitted between the driving shaft and the driven shaft, is relatively low, rotary torque of the driving shaft is transmitted to the driven shaft via the elastic member made of an elastic material.

In contrast, when the torque, which is to be transmitted between the driving shaft and the driven shaft, increases, the elastic member is elastically deformed in the circumferential direction (elastically crushed). Circumferential side surfaces of the convex portions configuring the outer-diameter-side concave-convex portion, which is provided on one shaft of the driving shaft and the driven shaft, and circumferential side surfaces of the convex portions configuring the inner-diameter-side concave-convex portion, which is provided on the other shaft, collide (contact) each other. Since the force of collision is weakened by the elastic member, it is possible to suppress generation of the abnormal noise such as harsh gear striking noise, which is to be caused due to the collision at the engagement part between the outer-diameter-side and inner-diameter-side concave-convex portions. At this state, most of the rotary torque of the driving shaft is transmitted to the driven shaft through the engagement between the outer-diameter-side and inner-diameter-side concave-convex portions. That is, it is possible to divide the torque transmission characteristics between the driving shaft and the driven shaft into at least two stages in accordance with a magnitude of the torque to be transmitted.

DETAILED DESCRIPTION OF EMBODIMENTS

First Example of Embodiment

Figure 1:
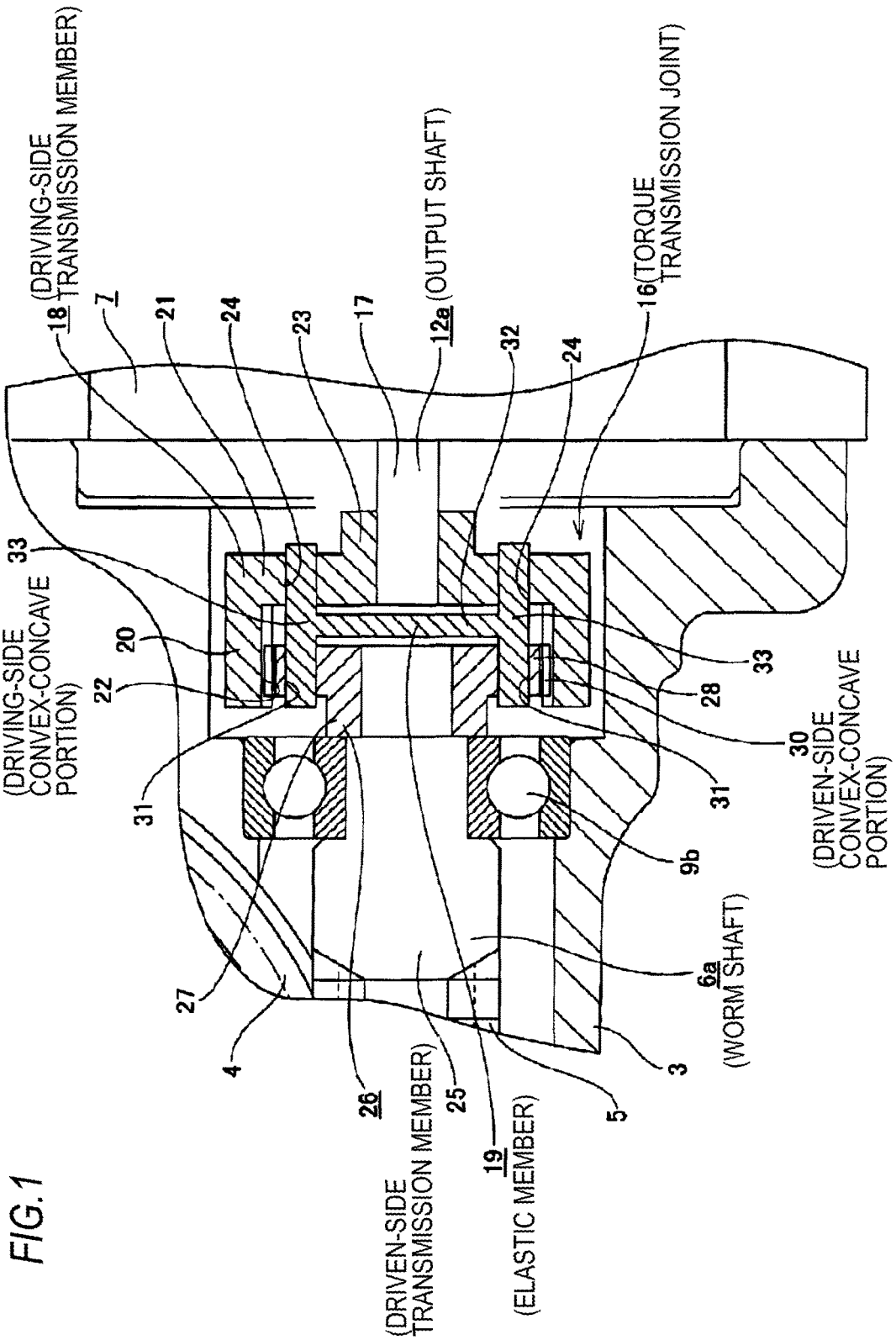
FIG. 1 is an enlarged sectional view showing a first example of an embodiment of the present invention.
Figure 2A:
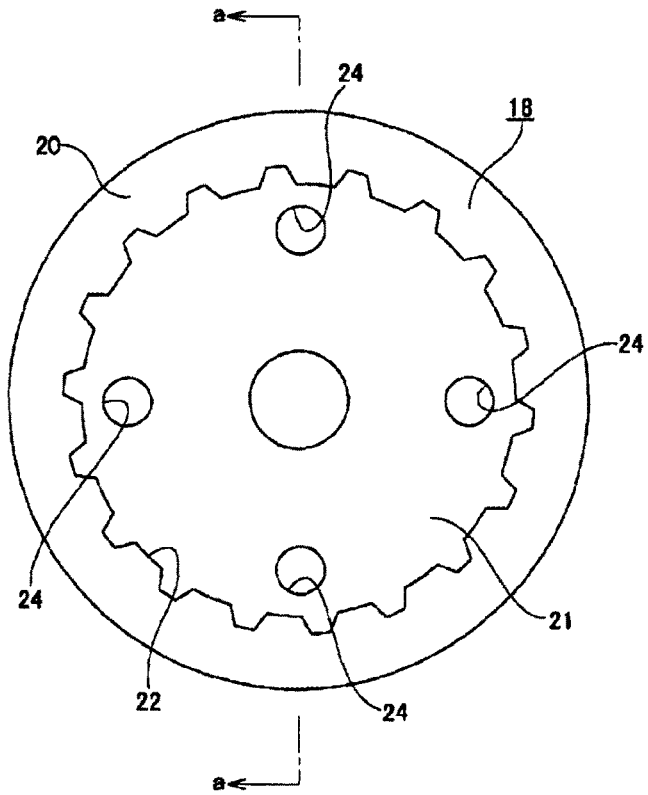
FIG. 2A is an end view showing a driving-side transmission member.
Figure 2B:
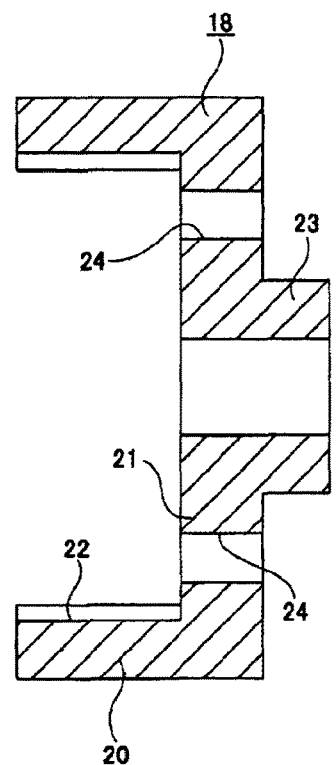
FIG. 2B is a sectional view taken along a line a-a of FIG. 2A.
Figure 3A:
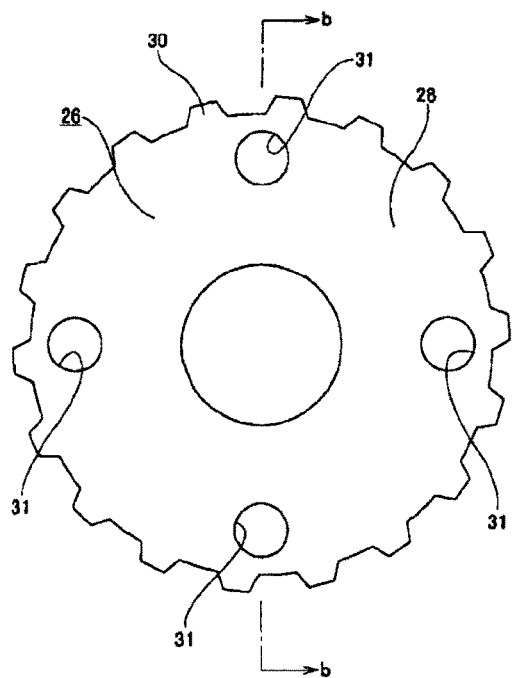
FIG. 3A is an end view showing a driven-side transmission member.
Figure 3B:
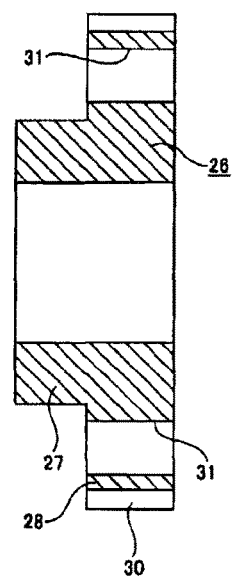
FIG. 3B is a sectional view taken along a line b-b of FIG. 3A.
Figure 4A:
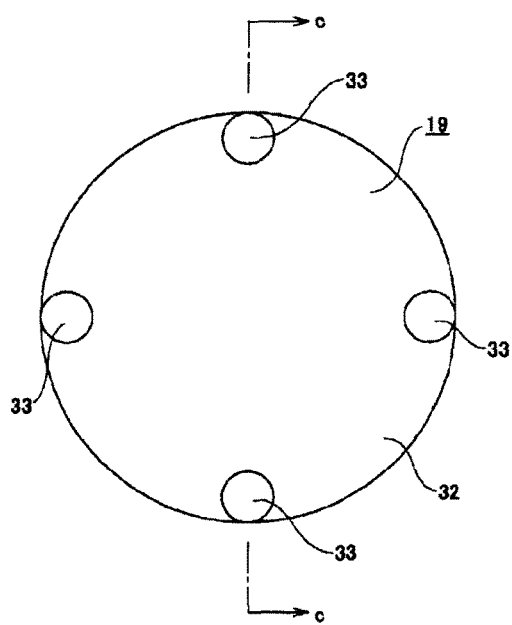
FIG. 4A is an end view showing an elastic member.
Figure 4B:
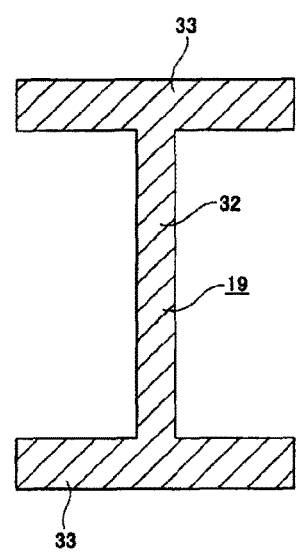
FIG. 4B is a sectional view taken along a line c-c of FIG. 4A.
Figure 5:
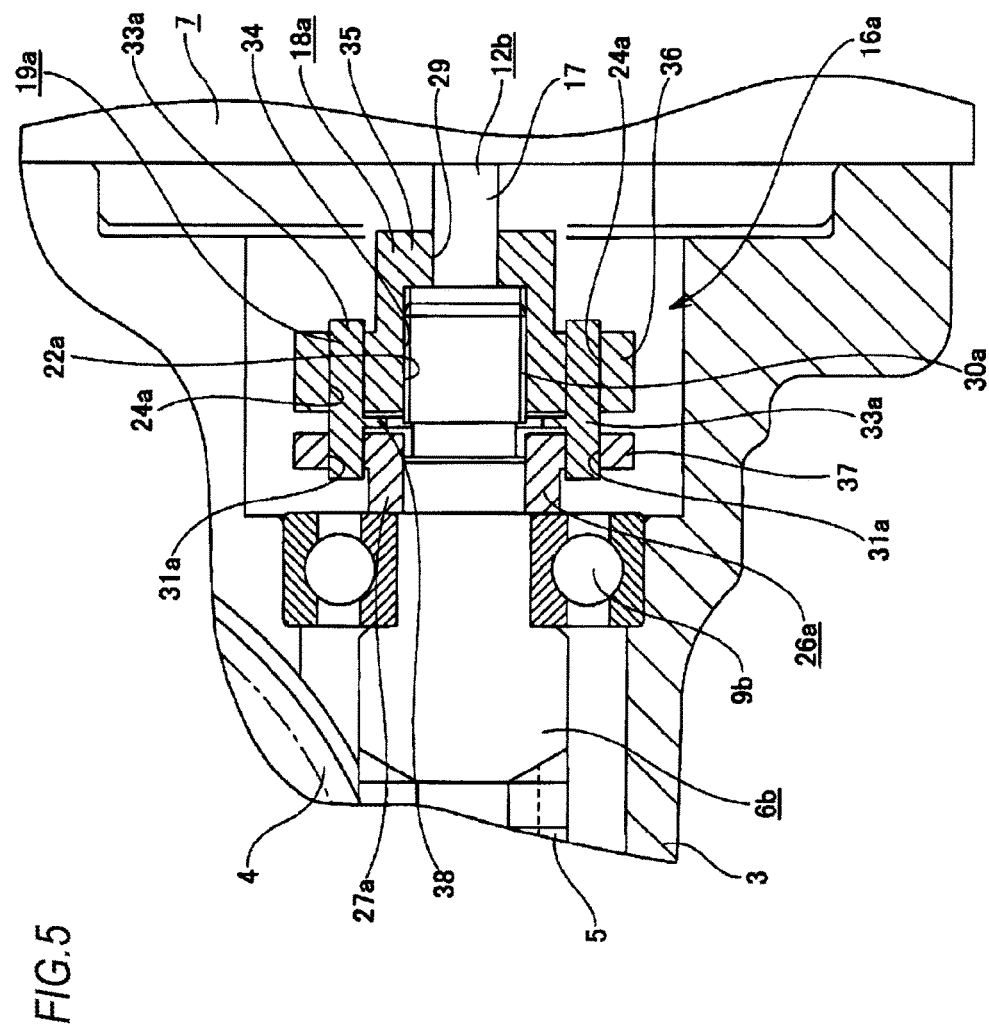
FIG. 5 is an enlarged sectional view showing a second example of the embodiment of the present invention.
Figure 6A:
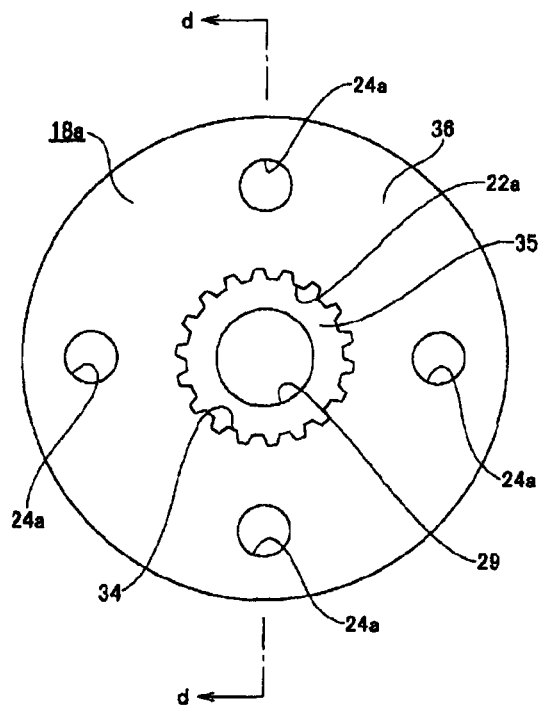
FIG. 6A is an end view showing a driving-side transmission member.
Figure 6B:
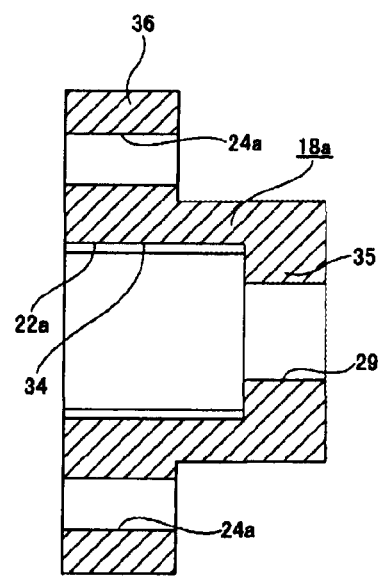
FIG. 6B is a sectional view taken along a line d-d of FIG. 6A.
Figure 7A:
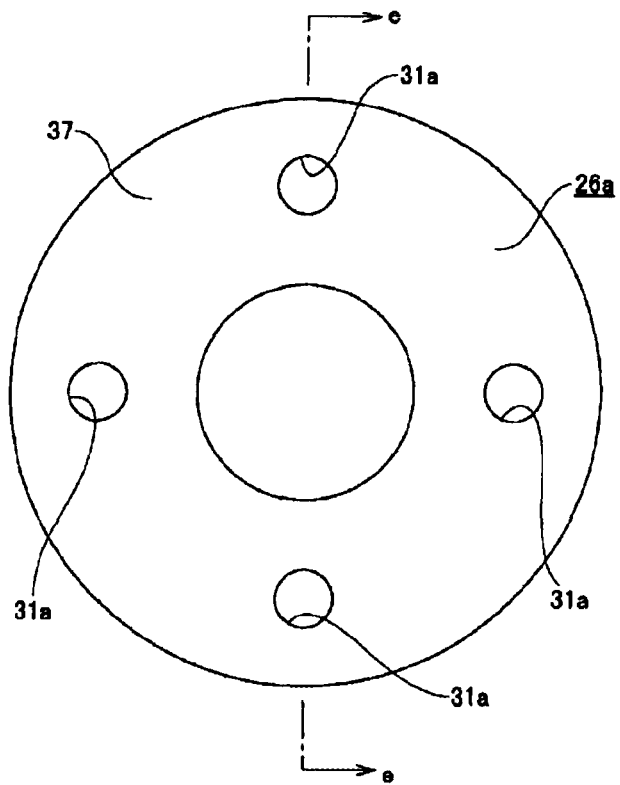
FIG. 7A is an end view showing a driven-side transmission member.
Figure 7B:
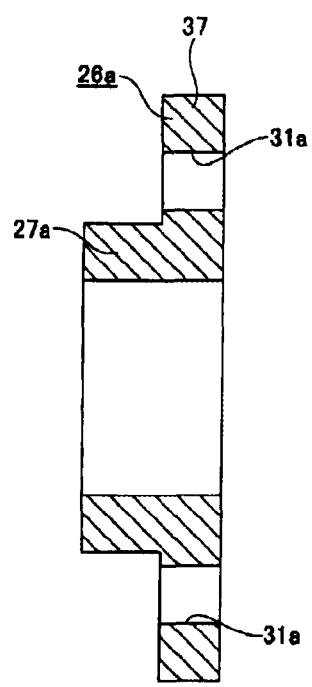
FIG. 7B is a sectional view taken along a line e-e of FIG. 7A.
Figure 8A:
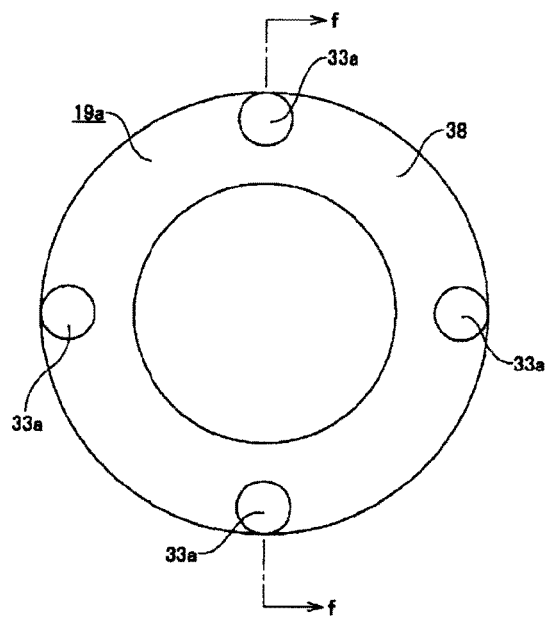
FIG. 8A is an end view showing an elastic member.
Figure 8B:
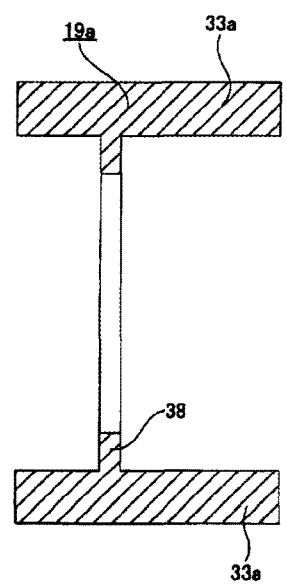
FIG. 8B is a sectional view taken along a line f-f of FIG. 8A.
Figure 9:
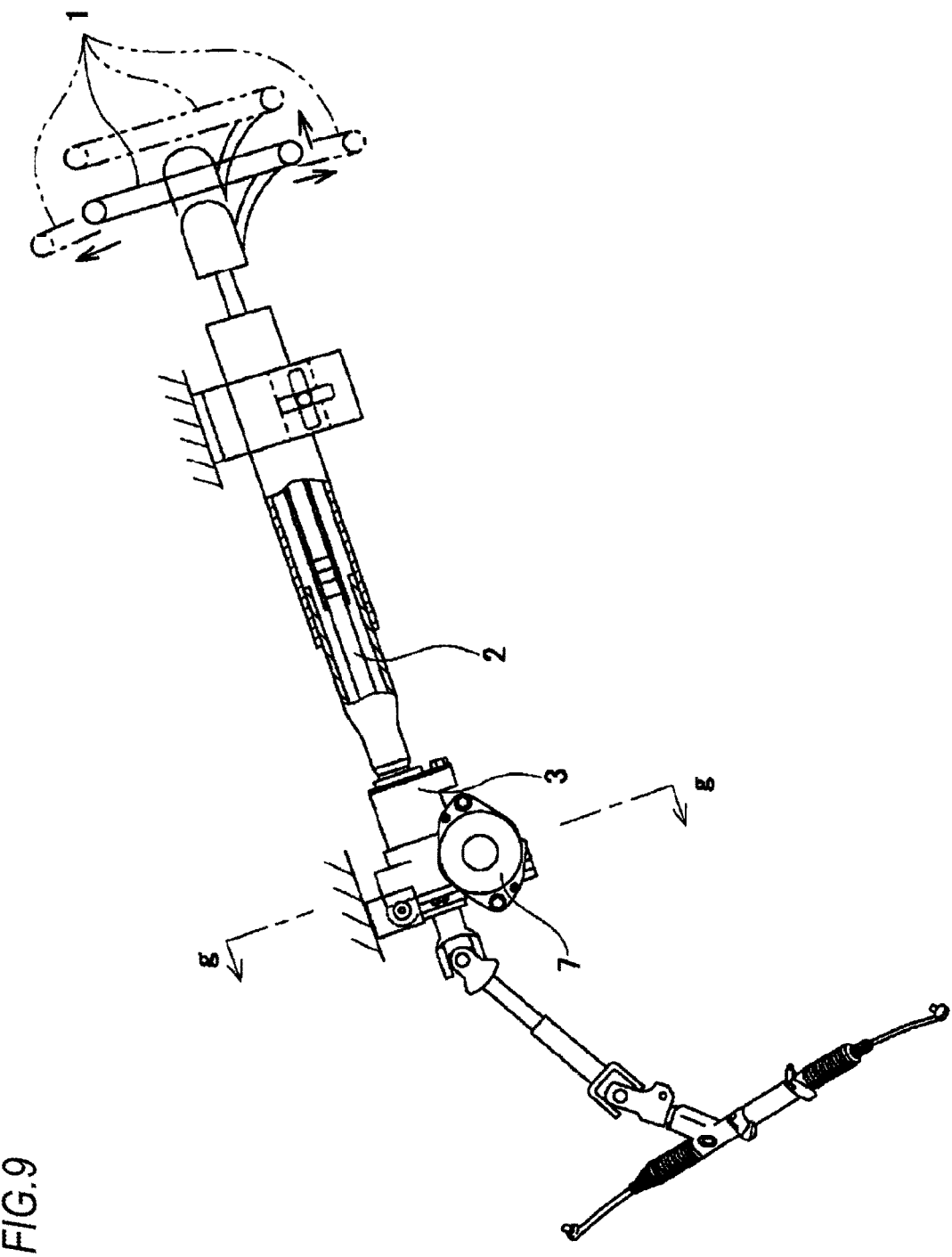
FIG. 9 is a partially longitudinal side view showing an example of a steering device of an automobile.
Figure 10:
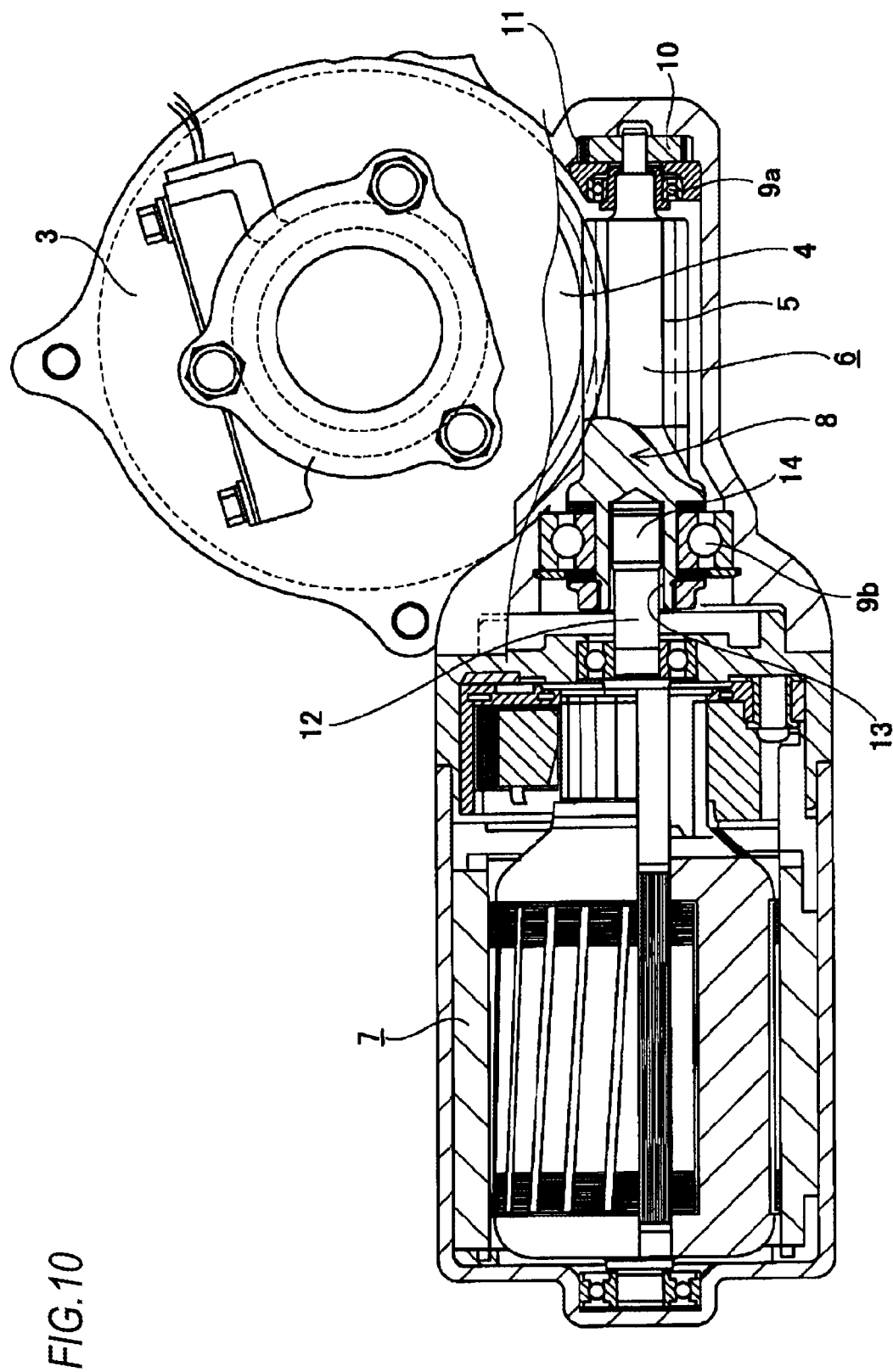
FIG. 10 is an enlarged sectional view taken along a line g-g of FIG. 9, showing an example of a conventional structure of an electric power steering device.

FIGS. 1 to 4 show a first example of an embodiment of the present invention. In the first example, a structure capable of suppression an abnormal noise such as gear striking noise when changing a rotational direction of an output shaft of an electric motor, which is a driving shaft, is implemented. In the electric power steering device of the first example, similarly to the conventional structure shown in FIGS. 9 and 10, a front end portion of a steering shaft 2 configured to rotate in a predetermined direction by a steering wheel 1 is rotatably supported in a housing 3, and a worm wheel 4 is fixed to this part. Worm teeth 5 configured to mesh with the worm wheel 4 are provided on an axially intermediate part of a worm shaft 6a, and both axial end portions of a worm 8 configured to rotate by an electric motor 7 are rotatably supported in the housing 3 by a pair of rolling bearings 9a, 9b. A preload applying mechanism, including for example a pressing piece 10 and coil spring 11, is provided between the rolling bearing 9a externally fitted to a tip portion of the worm shaft 6a and the housing 3 such that the worm teeth 5 provided on the worm shaft 6a are pressed toward the worm wheel 4. By this configuration, a backlash between the worm teeth 5 and the worm wheel 4 is suppressed to reduce generation of the gear striking noise.

In the first example, a tip portion (a left end portion in FIG. 1) of an output shaft 12a of the electric motor 7 and a base end portion (a right end portion in FIG. 1) of the worm shaft 6a are coupled via a torque transmission joint 16 such that torque can be transmitted. A driving-side transmission member 18, which is provided separately from an output shaft main body 17 of the output shaft 12a, is fixed to a tip portion of the output shaft main body 17 with relative rotation to the output shaft main body 17 being restricted. The driving-side transmission member 18 has a driving-side fitting cylindrical part 23, a circular wheel-shaped bottom plate part 21 extending radially outward from an axial end portion (an end portion facing the worm shaft 6a) of the driving-side fitting cylindrical part 23, and a cylindrical part 20 extending axially toward the worm shaft 6a from an outer peripheral edge portion of the bottom plate part 21. The tip portion of the output shaft main body 17 is internally fitted and fixed to an inner side of the driving-side fitting cylindrical part 23 by interference-fit. A radially intermediate part of the bottom plate part 21 is provided with driving-side engagement holes 24, 24, each of which penetrates the bottom plate part 21, at four positions with equal intervals in a circumferential direction. An inner periphery of the cylindrical part 20 is provided thereon with a driving-side concave-convex portion 22, which is an outer-diameter-side concave-convex portion formed by alternately arranging concave portions and convex portions over an entire circumference thereof. In the first example, the driving-side concave-convex portion 22 is configured as female spline teeth. The driving-side transmission member 18 is made of a material such as a synthetic resin, sintered metal or the like, which is more difficult to be elastically deformed (having higher stiffness) than an elastic material such as elastomer, for example, rubber configuring an elastic member 19 of the torque transmission joint 16, which will be described later.

A driven-side transmission member 26, which is provided separately from a worm shaft main body 25 of the worm shaft 6a, is fixed to a base end portion of the worm shaft main body 25 with relative rotation to the worm shaft main body 25 being restricted. The driven-side transmission member 26 is made of a material such as a synthetic resin, sintered metal or the like, which is more difficult to be elastically deformed (having higher stiffness) than an elastic material configuring the elastic member 19. The driven-side transmission member 26 has a driven-side fitting cylindrical part 27 and an outward flange-shaped flange part 28 formed on an outer periphery of an axial end portion (an end portion facing the output shaft 12a) of the driven-side fitting cylindrical part 27. A base end portion of the worm shaft main body 25 is internally fitted and fixed to an inner side of the driven-side fitting cylindrical part 27 by interference-fit.

An outer periphery of the flange part 28 is provided thereon with a driven-side concave-convex portion 30, which is an inner-diameter-side concave-convex portion formed by alternately arranging concave portions and convex portions over an entire circumference thereof. A radially intermediate part of the flange part 28 is provided with driven-side engagement holes 31, 31, each of which penetrates the flange part 28, at four positions with equal intervals in the circumferential direction. In the first example, the driven-side concave-convex portion 30 is configured as male spline teeth.

The elastic member 19 is integrally formed by an elastic material such as elastomer, for example, rubber. The elastic member 19 has a circular plate part 32 and cylindrical column parts 33, 33 provided at four circumferential positions with equal intervals in the circumferential direction of an outer peripheral edge portion of the circular plate part 32 to protrude toward both axial sides. In other words, axially intermediate parts of the respective column parts 33, 33 disposed at four positions with equal intervals in the circumferential direction are coupled by the circular plate part 32. The respective column parts 33, 33 are arranged around center axes of the output shaft 12a and the worm shaft 6a.

In the first example, the driving-side transmission member 18 provided at the tip portion of the output shaft 12a and the driven-side transmission member 26 provided at the base end portion of the worm shaft 6a are combined via the elastic member 19 such that the torque can be transmitted therebetween. Thereby, the torque transmission joint 16 is configured. That is, the driving-side concave-convex portion 22 and the driven-side concave-convex portion 30 are engaged with a circumferential gap being interposed therebetween, one axial end portions (right end portions in FIG. 1) of the column parts 33, 33 configuring the elastic member 19 are engaged to the respective driving-side engagement holes 24, 24, and the other axial end portions (left end portions in FIG. 1) are engaged to the driven-side engagement holes 31, 31 (the end portions are internally fitted with radiuses being reduced). Meanwhile, the torque transmission joint 16 of the first example is configured such that a bottom surface of the bottom plate part 21 and an axial side surface (and a base end surface of the worm shaft main body 25) of the flange part 28 face axial side surfaces of the circular plate part 32 configuring the elastic member 19a with axial gaps being interposed therebetween, respectively.

According to the electric power steering device of the first example, when the torque, which is to be transmitted between the output shaft 12a of the electric motor 7 and the worm shaft 6a, is relatively low, the rotary torque of the output shaft 12a is transmitted from the engagement parts (fitting parts) between the respective driving-side engagement holes 24, 24 and one axial end portions of the respective column parts 33, 33 to the elastic member 19. The torque transmitted to the elastic member 19 is transmitted to the worm shaft 6a through the engagement parts between the other axial end portions of the respective column parts 33, 33 and the respective driven-side engagement holes 31, 31.

In contrast, when the torque to be transmitted between the output shaft 12a and the worm shaft 6a increases, the elastic member 19 is elastically deformed in the circumferential direction. That is, axial end portions of each of the column parts 33, 33 configuring the elastic member 19 are elastically crushed in the circumferential direction (the circumferential width dimension is reduced). Then, circumferential side surfaces of the convex portions configuring the driving-side concave-convex portion 22 and circumferential side surfaces of the convex portions configuring the driven-side concave-convex portion 30 collide (contact) each other. Since the force of collision is weakened by the elastic deformation of the elastic member 19, it is possible to suppress generation of an abnormal noise such as harsh gear striking noise, which is to be caused due to the collision at the engagement part (the spline engagement part) between the driving-side concave-convex portion 22 and the driven-side concave-convex portion 30. At this state, most of the rotary torque of the output shaft 12a is transmitted to the worm shaft 6a through the engagement part between the driving-side concave-convex portion 22 and the driven-side concave-convex portion 30.

As described above, according to the electric power steering device of the first example, the torque transmission between the output shaft 12a and the worm shaft 6a is made through the torque transmission joint 16 having the elastic member 19. Thereby, it is possible to divide the torque transmission characteristics into two stages in accordance with a magnitude of the torque to be transmitted, so that it is possible to make an operational feeling of the steering wheel 1 (refer to FIG. 9) favorable. That is, in general, when vibration load is applied from wheels to the steering shaft 2 due to a rough road surface or the like, the electric power steering device applies the torque to the worm wheel 4 fixed to the steering shaft 2. When the torque is detected by a torque sensor, a controller (not shown) generates torque in a direction of cancelling the torque by the electric motor 7. Thereby, it is possible to make the operational feeling of the steering wheel 1 favorable. Herein, the worm shaft 6a having the worm teeth 5 configured to mesh with the worm wheel 4 tends to rotate by a reactive force of the torque applied to the worm wheel 4. However, when a resistance (torsional rigidity) against the relative rotation between the worm shaft 6a and the output shaft 12a of the electric motor 7 is high, a resistance against the rotation of the worm shaft 6a increases. Since the torque, which is to be applied to the worm wheel 4 based on the vibration load applied to the steering shaft 2, is relatively low, when the rotation resistance of the worm shaft 6a is high, the operational feeling of the steering wheel 1 may be deteriorated. In the first example, the torque transmission between the output shaft 12a and the worm shaft 6a is performed via the torque transmission joint 16. Therefore, when the torque to be transmitted between the output shaft 12a and the worm shaft 6a is low, the torsional rigidity can be made low, and when the torque to be transmitted is high, the torsional rigidity can be made high. As a result, it is possible to make the operational feeling of the steering wheel 1 favorable.

Since the circumferential gap is interposed between the driving-side concave-convex portion 22 and the driven-side concave-convex portion 30, it is possible to allow swingable displacement of the worm shaft 6a or to allow a center axis of the worm shaft 6a and a center axis of the output shaft 12a to be eccentric and to be thus mismatched each other, so that it is possible to smoothly transmit the torque between the output shaft 12a and the worm shaft 6a.

When implementing the first example, it is possible to change the number, sizes and shapes of the column parts 33, 33 configuring the elastic member 19. That is, five or more, two or three column parts 33, 33 may be provided, and the column parts 33, 33 may be made to have a rectangular or elliptical section. The number, sizes and shapes of the column parts 33, 33 are set in accordance with the magnitude of the torque to be transmitted by the elastic member 19 or the magnitude of the torsional rigidity.

In the first example, the driving-side transmission member 18, which is provided separately from the output shaft main body 17, is supported and fixed to the tip portion of the output shaft main body 17, so that a concave part (the cylindrical part 20 and the bottom plate part 21) having the driving-side concave-convex portion 22 provided on an inner periphery thereof is provided at the tip portion of the output shaft 12a. However, the concave part may be provided integrally with the output shaft main body. Similarly, the flange part having the driven-side concave-convex portion provided on the outer periphery thereof may be provided integrally with the worm shaft main body.

Second Example of Embodiment

FIGS. 5 to 8 show a second example of the embodiment of the present invention. In the second example, when the torque to be transmitted between an output shaft 12b of the electric motor 7 and a worm shaft 6b is relatively low, a torque transmission joint 16a transmits the rotary torque of the output shaft 12b to the worm shaft 6b via an elastic member 19a made of an elastic material such as elastomer, for example, rubber. In contrast, when the torque to be transmitted between the output shaft 12b and the worm shaft 6b is relatively high, the torque transmission joint transmits the rotary torque of the output shaft 12b to the worm shaft 6b through the engagement part between a driving-side concave-convex portion 22a provided on the output shaft 12a and a driven-side concave-convex portion 30a provided on the worm shaft 6a. To this end, a driving-side transmission member 18a provided separately from the output shaft main body 17 of the output shaft 12b is provided at the tip portion of the output shaft main body 17 with the relative rotation to the output shaft main body 17 being restricted. The driving-side transmission member 18a has a concave part 34, which is concave in the axial direction, provided on a tip surface (a surface facing the worm shaft 6a with respect to the axial direction), and the driving-side concave-convex portion 22a (female spline teeth) is provided on an inner periphery of the concave part 34. A center portion of a bottom 35 of the concave part 34 is formed with a fitting hole 29 penetrating the bottom 35 in the axial direction, and the tip portion of the output shaft main body 17 is internally fitted and fixed to the fitting hole 29 by the interference-fit. A driving-side flange part 36 having an outward flange shape is provided on an outer periphery of a tip portion of the driving-side transmission member 18a. A radially intermediate part of the driving-side flange part 36 is provided with driving-side engagement holes 24a, 24a, each of which penetrates the driving-side flange part 36 in the axial direction, at four positions with equal intervals in the circumferential direction.

In the second example, the driven-side concave-convex portion 30a (male spline teeth) is directly formed on an outer periphery of a base end portion of a worm shaft main body 25a of the worm shaft 6b. A driven-side transmission member 26a provided separately from the worm shaft main body 25a is supported and fixed to a intermediate side part of the worm shaft main body 25a with the relative rotation to the worm shaft main body 25a being restricted. The driven-side transmission member 26a has a driven-side fitting cylindrical part 27a and a driven-side flange part 37 having an outward flange shape and formed on an outer periphery of a base end portion of the driven-side fitting cylindrical part 27a. A base end side part of the worm shaft main body 25a is internally fitted and fixed to an inner side of the driven-side fitting cylindrical part 27a by the interference-fit. A radially intermediate part of the driven-side flange part 37 is provided with driven-side engagement holes 31a, 31a, each of which penetrates the driven-side flange part 37 in the axial direction, at four positions with equal intervals in the circumferential direction.

The elastic member 19a is integrally formed, and has a circular wheel plate-shaped circular wheel part 38, and cylindrical column parts 33a, 33a provided at four positions with equal intervals in the circumferential direction of an outer peripheral edge portion of the circular wheel part 38 to protrude toward both axial sides. In other words, axially intermediate parts of the respective column parts 33a, 33a disposed at four positions with equal intervals in the circumferential direction are coupled by the circular wheel part 38.

The torque transmission universal joint 16a of the second example is configured such that the driving-side concave-convex portion 22a and the driven-side concave-convex portion 30a are engaged with each other with a circumferential gap being interposed therebetween, and one axial end portions of the column parts 33a, 33a configuring the elastic member 19a are engaged to the driving-side engagement holes 24a, 24a and the other axial end portions are engaged to the driven-side engagement holes 31a, 31a.

According to the electric power steering device of the second example, when the torque to be transmitted between the output shaft 12b of the electric motor 7 and the worm shaft 6b is relatively low, the rotary torque of the output shaft 12b is transmitted from the engagement parts (fitting parts) between the respective driving-side engagement holes 24a, 24a and one axial end portions of the respective column parts 33a, 33a to the elastic member 19a. The torque transmitted to the elastic member 19a is transmitted to the worm shaft 6b through the engagement parts between the other axial end portions of the respective column parts 33a, 33a and the respective driven-side engagement holes 31a, 31a.

In contrast, when the torque to be transmitted between the output shaft 12b and the worm shaft 6b increases, the elastic member 19a is elastically deformed in the circumferential direction. That is, both axial end portions of each of the column parts 33a, 33a configuring the elastic member 19a are elastically crushed in the circumferential direction. Then, circumferential side surfaces of the convex portions configuring the driving-side concave-convex portion 22a and circumferential side surfaces of the convex portions configuring the driven-side concave-convex portion 30a collide (contact) each other. The force of the collision is weakened by the elastic deformation of the elastic member 19a. At this state, most of the rotary torque of the output shaft 12b is transmitted to the worm shaft 6b from the engagement part between the driving-side concave-convex portion 22a and the driven-side concave-convex portion 30a.

The configurations and operations of the other parts are the same as the first example of the embodiment.

First Modified Example of Embodiment

Figure 11:
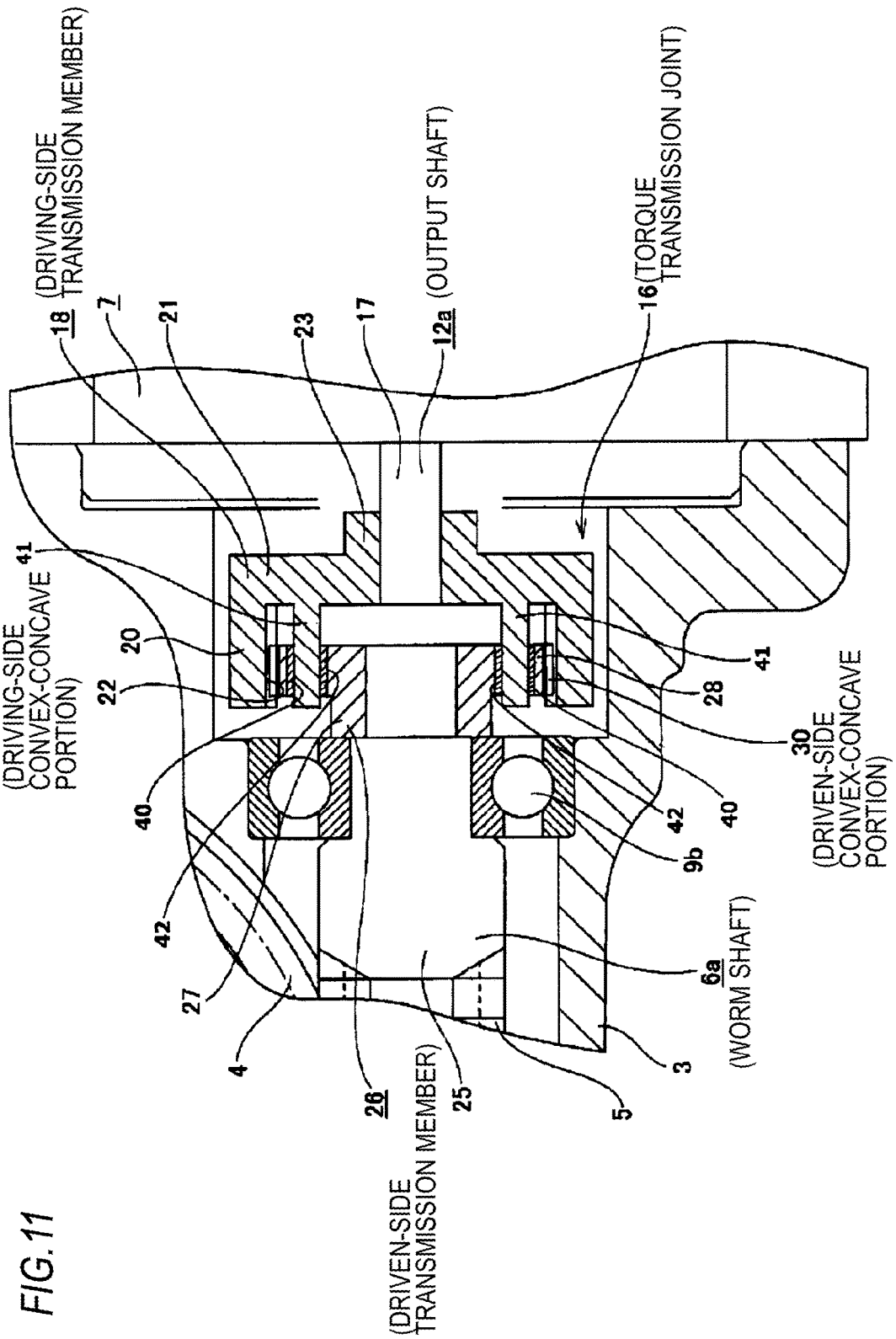
FIG. 11 is a similar view to FIG. 1, showing a first modified example of the embodiment of the present invention.

FIG. 11 shows a first modified example of the embodiment.

As shown in FIG. 11, six pins 41 are circumferentially provided with equal intervals on one circumference at a worm shaft-side of the bottom plate part 21 of the driving-side transmission member 18. The flange part 28 of the driven-side transmission member 26 is formed with pin insertion holes 42 at six positions facing the pins 41 with equal intervals in the circumferential direction. Tubular elastic members 40 are affixed to outer peripheries of the pins 41 or inner peripheries of the pin insertion holes 42, and the pins 41 and the pin insertion holes 42 are engaged via the elastic members 40 such as elastomer, for example rubber.

Also in the configuration of the first modified example, the same operations and effects as the first example of the embodiment are achieved.

Second Modified Example of Embodiment

Figure 12:
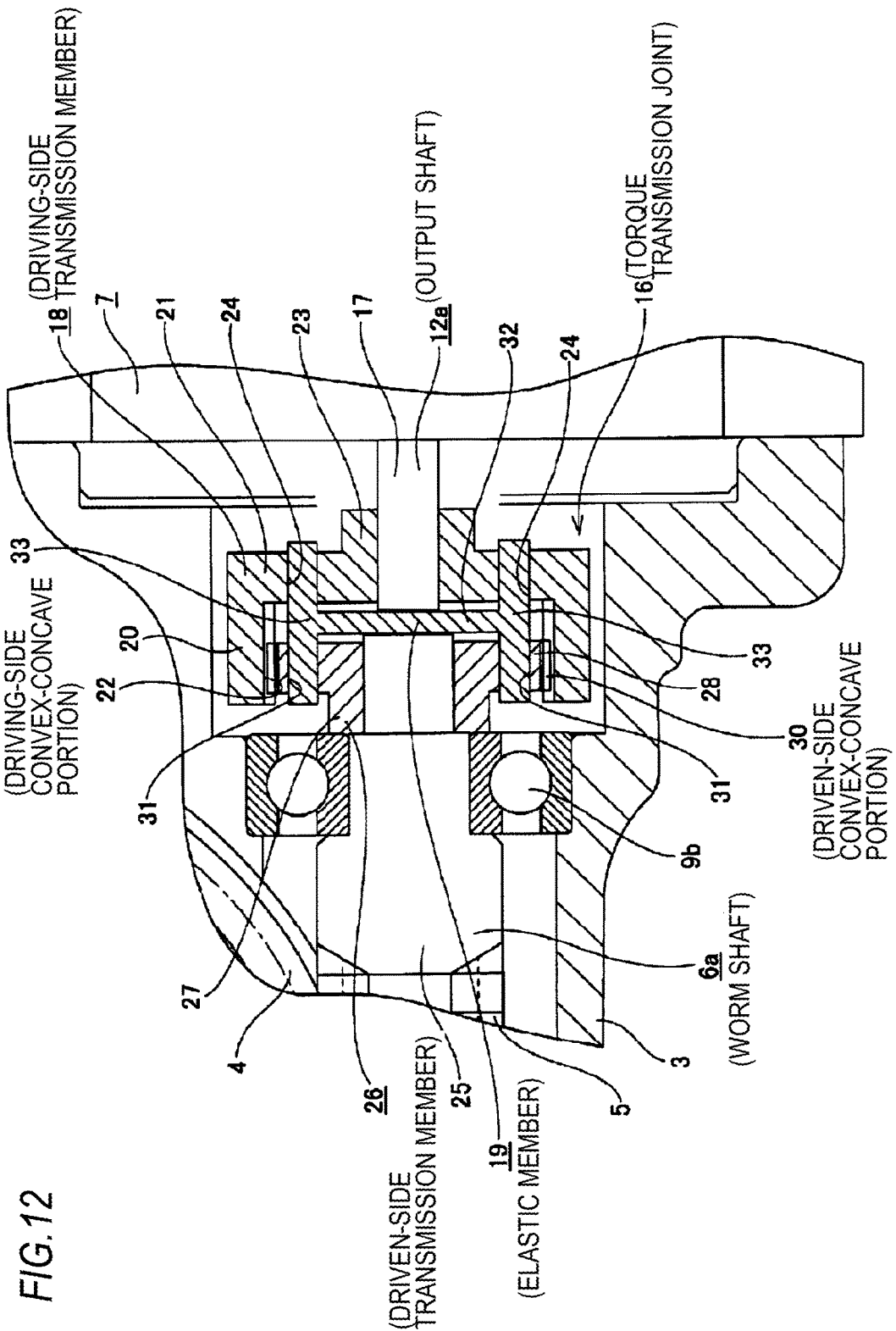
FIG. 12 is a similar view to FIG. 1, showing a second modified example of the embodiment of the present invention.

FIG. 12 shows a second modified example of the embodiment.

As shown in FIG. 12, the tip portion of the output shaft main body 17 of the output shaft 12a and the tip portion of the worm shaft main body 25 of the worm shaft 6a are axially contacted to the circular plate part 32 of the elastic member 19 so as to sandwich the circular plate part 32 therebetween. According to this configuration, it is possible to restrict axial movement of the elastic member 19.

Third Modified Example of Embodiment

Figure 13:
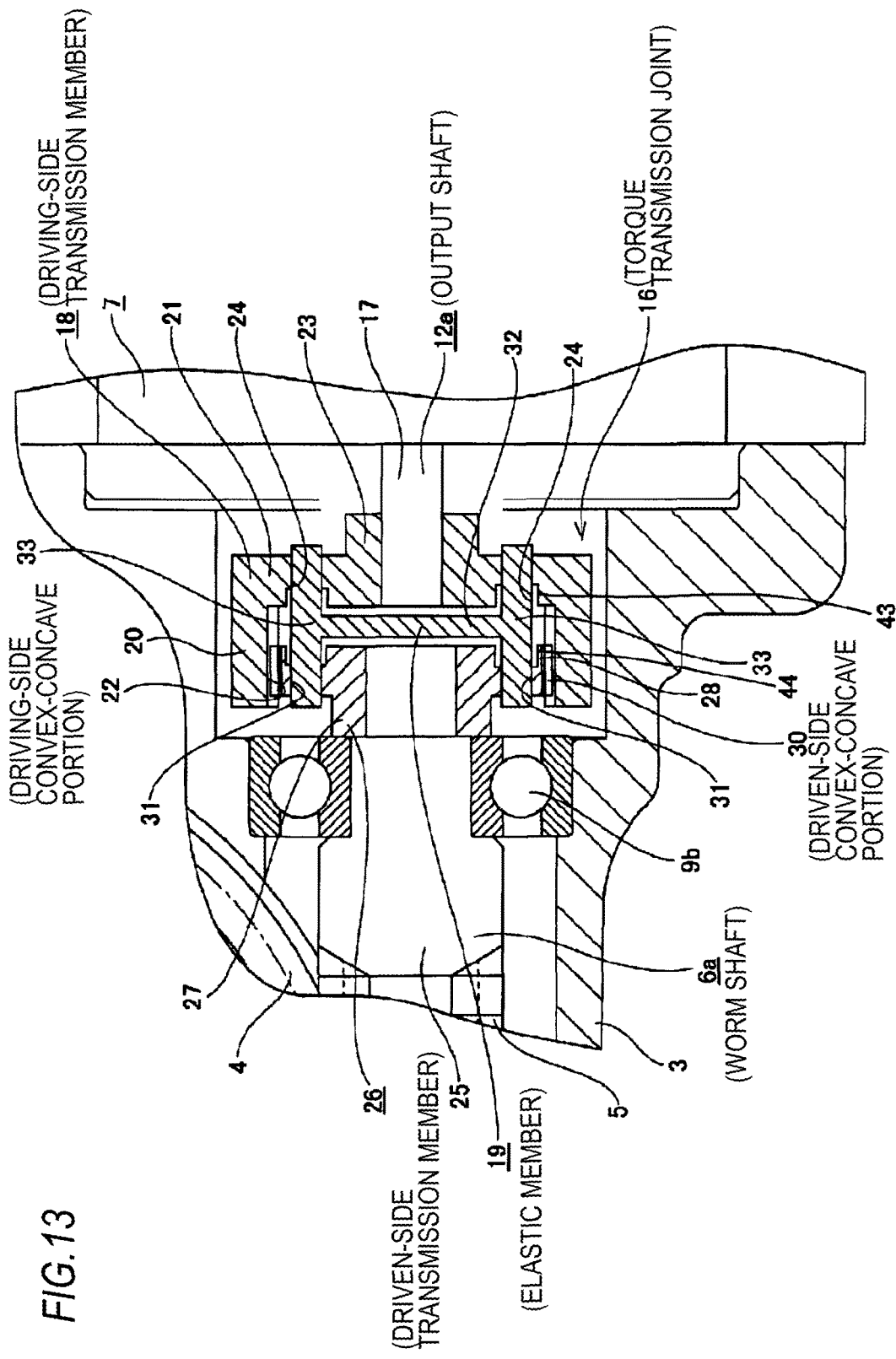
FIG. 13 is a similar view to FIG. 1, showing a third modified example of the embodiment of the present invention.

FIG. 13 shows a third modified example of the embodiment.

As shown in FIG. 13, the driving-side engagement hole 24 has a widened part 43 which is wider than a part to which the column part 33 of the elastic member 19 is to be contacted and engaged, and a gap is formed between the widened part and the column part 33. Also, the driven-side engagement hole 31 has a widened part 44 which is wider than a part to which the column part 33 of the elastic member 19 is to be contacted and engaged, and a gap is formed between the widened part and the column part 33.

When the worm shaft 6a swingably displaced or the center axis of the worm shaft 6a and the center axis of the output shaft 12a become eccentric and are thus mismatched each other, the elastic member 19 is expanded or contracted to absorb the displacement. According to the configuration of the third modified example, since the gaps are formed between the column part 33 and the widened part 43 of the driving-side engagement hole 24 and between the column part 33 and the widened part 44 of the driven-side engagement hole 31, a region in which the elastic member 19 can be expanded or contracted is widened, so that the elastic member can easily absorb the displacement of the worm shaft 6a.

The present application is based on a Japanese Patent Application No. 2014-241030 filed on Nov. 28, 2014 and a Japanese Patent Application No. 2015-029124 filed on Feb. 18, 2015, the contents of which are herein incorporated by reference.

DESCRIPTION OF REFERENCE NUMERALS

1: steering wheel
2: steering shaft
3: housing
4: worm wheel
5: worm teeth
6, 6a, 6b: worm shaft
7: electric motor
8: worm
9a, 9b: rolling bearing
10: pressing piece
11: coil spring
12, 12a, 12b: output shaft
13: spline hole
14: spline shaft part
15: preload applying mechanism
16, 16a: torque transmission joint
17: output shaft main body
18, 18a: driving-side transmission member
19, 19a: elastic member
20: cylindrical part
21: bottom plate part
22, 22a: driving-side concave-convex portion
23: driving-side fitting cylindrical part
24, 24a: driving-side engagement hole
25, 25a: worm shaft main body
26, 26a: driven-side transmission member
27, 27a: driven-side fitting cylindrical part
28: flange part
29: fitting hole
30, 30a: driven-side concave-convex portion
31, 31a: driven-side engagement hole
32: circular plate part
33, 33a: column part
34: concave part
35: bottom
36: driving-side flange part
37: driven-side flange part
38: circular wheel part
40: elastic member
41: pin
42: pin insertion hole
43: widened part
44: widened part

The invention claimed is:

1. A torque transmission joint configured to transmit torque between end portions of a driving shaft and a driven shaft arranged in series in an axial direction,
wherein an outer-diameter-side concave-convex portion is formed by alternately arranging concave portions and convex portions over an entire circumference either directly on an inner periphery of one shaft of the driving shaft and the driven shaft or on an inner periphery of a member fixed to the one shaft, an inner-diameter-side concave-convex portion is formed by alternately arranging concave portions and convex portions over an entire circumference either directly on an outer periphery of the other shaft of the driving shaft and the driven shaft or on an outer periphery of a member fixed to the other shaft, and the outer-diameter-side concave-convex portion and the inner-diameter-side concave-convex portion are engaged with a circumferential gap being interposed therebetween,
wherein an elastic member made of an elastic material is provided between the end portion of the driving shaft and the end portion of the driven shaft either directly or via another member such that torque can be transmitted between the driving shaft and the driven shaft,
wherein the elastic member includes a column part arranged in the axial direction,
wherein axial end portions of the column part are engaged to engagement concave portions formed respectively at portions deviating from a center axis of the driving shaft and a center axis of the driven shaft,
wherein the column part is provided in plural around the center axis of the driving shaft and the center axis of the driven shaft,
wherein a concave part is formed either directly on a center part of an end surface of the one shaft or on a center part of an end surface of the member fixed to the one shaft, and the outer-diameter-side concave-convex portion is formed on an inner periphery of the concave part,
wherein a flange part having an outward flange shape is formed either directly on an outer periphery of the end portion of the other shaft or on the member fixed to the one shaft, and the inner-diameter-side concave-convex portion is formed on an outer periphery of the flange part, and
wherein the engagement concave portions are formed at a plurality of positions with equal intervals in a circumferential direction on a bottom surface of the concave part and on an axial side surface of the flange part facing the bottom surface.

2. The torque transmission joint according to claim 1, wherein each column part is coupled by a circular plate-shaped or circular wheel-shaped coupling plate part.

3. The torque transmission joint according to claim 2, wherein the driving shaft and the driven shaft contact the coupling plate part so as to sandwich the coupling plate part therebetween.

4. The torque transmission joint according to claim 1, wherein the engagement concave portion includes a widened part which is wider than a part to which the column part contacts to be engaged such that a gap is formed between the widened part and the column part.

5. An electric power steering device comprising:
a non-rotatable housing which is supported to a fixed part;
a steering rotary shaft which is provided to be rotatable relative to the housing and configured to be rotated by an operation of the steering wheel and to apply a steering angle to steered wheels according to the rotation;
a worm wheel which is supported to a part of the steering rotary shaft concentrically with the steering rotary shaft in the housing and configured to rotate together with the steering rotary shaft;
a worm which includes worm teeth provided on an axially intermediate portion of a worm shaft, wherein axial end portions of the worm shaft are respectively rotatably supported to the housing by bearings with the worm teeth being meshed with the worm wheel; and
an electric motor which is configured to rotate the worm,
wherein an output shaft of the electric motor and the worm shaft are connected by a torque transmission joint such that torque can be transmitted, and
wherein the torque transmission joint is the torque transmission joint according to claim 1.

6. The electric power steering device according to claim 5,
wherein a preload applying mechanism configured to elastically press the worm toward the worm wheel is provided between a tip portion of the worm shaft and the housing.

7. A torque transmission joint configured to transmit torque between end portions of a driving shaft and a driven shaft arranged in series in an axial direction,
wherein an outer-diameter-side concave-convex portion is formed by alternately arranging concave portions and convex portions over an entire circumference either directly on an inner periphery of one shaft of the driving shaft and the driven shaft or on an inner periphery of a member fixed to the one shaft, an inner-diameter-side concave-convex portion is formed by alternately arranging concave portions and convex portions over an entire circumference either directly on an outer periphery of the other shaft of the driving shaft and the driven shaft or on an outer periphery of a member fixed to the other shaft, and the outer-diameter-side concave-convex portion and the inner-diameter-side concave-convex portion are engaged with a circumferential gap being interposed therebetween,
wherein an elastic member made of an elastic material is provided between the end portion of the driving shaft and the end portion of the driven shaft either directly or via another member such that torque can be transmitted between the driving shaft and the driven shaft,
wherein the elastic member includes a column part arranged in the axial direction,
wherein axial end portions of the column part are engaged to engagement concave portions formed respectively at portions deviating from a center axis of the driving shaft and a center axis of the driven shaft,
wherein the column part is provided in plural around the center axis of the driving shaft and the center axis of the driven shaft,
wherein a concave part is formed either directly on a center part of an end surface of the one shaft or on a center part of an end surface of the member fixed to the one shaft, the outer-diameter-side concave-convex portion is formed on an inner periphery of the concave part, and a first flange part having an outward flange shape is formed either directly on an outer periphery of the end portion of the one shaft or on the member fixed to the one shaft,
wherein the inner-diameter-side concave-convex portion is formed either directly on an outer periphery of the end portion of the other shaft or on an outer periphery of the member fixed to the other shaft, and a second flange part having an outward flange shape is formed either directly on an outer periphery of an intermediate side part of the other shaft or on the member fixed to the other shaft, and
wherein the engagement concave portions are formed at a plurality of positions with equal intervals in a circumferential direction on axial side surfaces of the first and second flange parts facing each other.

8. The torque transmission joint according to claim 7,
wherein each column part is coupled by a circular plate-shaped or circular wheel-shaped coupling plate part.

9. The torque transmission joint according to claim 8,
wherein the driving shaft and the driven shaft contact the coupling plate part so as to sandwich the coupling plate part therebetween.

10. The torque transmission joint according to claim 7,
wherein the engagement concave portion includes a widened part which is wider than a part to which the column part contacts to be engaged such that a gap is formed between the widened part and the column part.

* * * * *